US007215925B2

(12) United States Patent
Holloway et al.

(10) Patent No.: US 7,215,925 B2
(45) Date of Patent: May 8, 2007

(54) BROADCASTING REAL-TIME SHORT RANGE RF REAL-TIME INFORMATION TO MOTOR VEHICLES MOVING ALONG A HIGHWAY VIA A SEQUENCE OF SHORT RANGE RF BROADCASTING STATIONS ALONG THE HIGHWAY BROADCASTING TO ALL VEHICLE TRANSCEIVERS WITHIN SAID RANGE

(75) Inventors: Lane Thomas Holloway, Pflugerville, TX (US); Marques Benjamin Quiller, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 572 days.

(21) Appl. No.: 10/727,305

(22) Filed: Dec. 3, 2003

(65) Prior Publication Data

US 2005/0124292 A1 Jun. 9, 2005

(51) Int. Cl.
*H04B 7/00* (2006.01)

(52) U.S. Cl. ............... 455/41.2; 455/3.01; 455/186.1; 455/344; 455/345; 455/297; 340/466; 340/906; 342/357.1; 342/463; 701/301; 701/213

(58) Field of Classification Search ............... 455/41.2, 455/3.01, 186.1, 344, 296, 297, 345; 342/357.1, 342/463; 701/213, 301; 340/466, 905
See application file for complete search history.

(56) References Cited

U.S. PATENT DOCUMENTS 5,539,645 A * 7/1996 Mandhyan et al. ......... 701/119
5,918,180 A * 6/1999 Dimino .................... 455/456.3
6,023,616 A * 2/2000 Briskman ................... 455/344
6,407,673 B1 * 6/2002 Lane .......................... 340/901
6,647,270 B1 * 11/2003 Himmelstein ............ 455/456.1
6,734,823 B2 * 5/2004 Mintz et al. ................ 342/463
6,958,707 B1 * 10/2005 Siegel ........................ 340/902
6,965,321 B1 * 11/2005 Arab .......................... 340/901
7,027,773 B1 * 4/2006 McMillin ................... 455/41.2
7,092,723 B2 * 8/2006 Himmelstein ............ 455/456.1

* cited by examiner

*Primary Examiner*—Marceau Milord
(74) *Attorney, Agent, or Firm*—Julius B. Kraft; Gregory M. Doudnikoff

(57) ABSTRACT

A simple region-specific broadcasting system for broadcasting information pertinent to motor vehicles in sequential regions of a roadway or highway directly to such vehicles when the vehicles are passing through such sequential regions. Existing cellular facilities and resources may be advantageously used in the implementation of the system. A system for broadcasting short range RF real-time information to motor vehicles traveling along a roadway implemented through a sequence of transceiving short range broadcast stations along said highway, the stations spaced so that the broadcast ranges of said stations tangentially overlap each other. Each of the sequence of motor vehicles moving along this roadway should include a transceiver for the short range RF signals. There is in each of the motor vehicles with said transceivers, an implementation for transmitting data that is specific to the transmitting motor vehicle, together with means in the broadcast stations for broadcasting the data specific to the transmitting motor vehicle to all of said motor vehicle transceivers.

20 Claims, 4 Drawing Sheets

BROADCASTING REAL-TIME SHORT RANGE RF REAL-TIME INFORMATION TO MOTOR VEHICLES MOVING ALONG A HIGHWAY VIA A SEQUENCE OF SHORT RANGE RF BROADCASTING STATIONS ALONG THE HIGHWAY BROADCASTING TO ALL VEHICLE TRANSCEIVERS WITHIN SAID RANGE

TECHNICAL FIELD

The present invention relates to telecommunications through mobile wireless transmission systems and particularly to the use of such systems for broadcasting short range RF broadcasts to all within range vehicles moving along a highway.

BACKGROUND OF RELATED ART

With the globalization of business, industry and trade wherein transactions and activities within these fields have been changing from localized organizations to diverse transactions over the face of the world, the telecommunication industries have, accordingly, been expanding rapidly. Wireless telephones, such as cellular telephones, have become so pervasive that their world wide number is in the order of hundreds of millions. While the embodiment to be subsequently described uses cellular telephones as the example, the principles of the invention would be applicable to any wireless transmission device.

Despite the rapid expansion and the proliferation of wireless telephones and, particularly, cellular telephones and networks, the industry is in a state wherein available cellular telecommunication resources are expanding more rapidly than consumer demand. As a result, the industry is seeking new and expanded uses for its products. The present invention offers such an expanded application for wireless cellular telephone technology to provide real-time information about a wide variety of roadway conditions and situations to motor vehicles traveling along a roadway.

Traditionally, within a limited group of subscribers, e.g. truckers and others having an interest, citizens band (CB) radio broadcasts from the individual vehicles conveyed information about road conditions, such as hazards or information about other road situations, e.g. drivers with health emergencies. With CB radios, the information was not necessarily specific to any region except that drivers in certain locales might mutually agree to communicate over selected channels.

SUMMARY OF THE PRESENT INVENTION

The present invention provides a simple region-specific broadcasting system for broadcasting information pertinent to motor vehicles in sequential regions of a roadway or highway directly to such vehicles as the vehicles pass through such sequential regions. Although the invention need not be implemented in a cellular telecommunication system, the existing abundant cellular facilities and resources may be advantageously used in the implementation of the system.

Accordingly, in its broadest aspects, the present invention is a system for broadcasting short range RF real-time information to motor vehicles traveling along a roadway implemented through a sequence of transceiving short range broadcast stations along said highway, the stations are so spaced that the broadcast ranges of said stations tangentially overlap each other. Each of the sequence of motor vehicles moving along this roadway should include a transceiver for the short range RF signals. There are means in each of said motor vehicles with said transceivers for transmitting data that is specific to the transmitting motor vehicle together with means in the broadcast stations for broadcasting the specific data from the transmitting motor vehicle to all of said motor vehicle transceivers. As will be hereinafter described in greater detail, an existing telecommunications system may be used wherein the broadcast stations are cellular broadcast towers spaced along the roadway and the transceivers in the motor vehicles are cellular telephones. Thus, there may be further provided means associated with each of the broadcast stations for supplying information zones along said roadways respectively defined by the broadcast range of the closest broadcast station, and the means for broadcasting in each zone include means for broadcasting information of particular interest to all motor vehicles in each zone based upon the information transmitted from the individual motor vehicle. In addition, display means may be provided in each of said motor vehicles associated with the transceivers for displaying received broadcast data.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
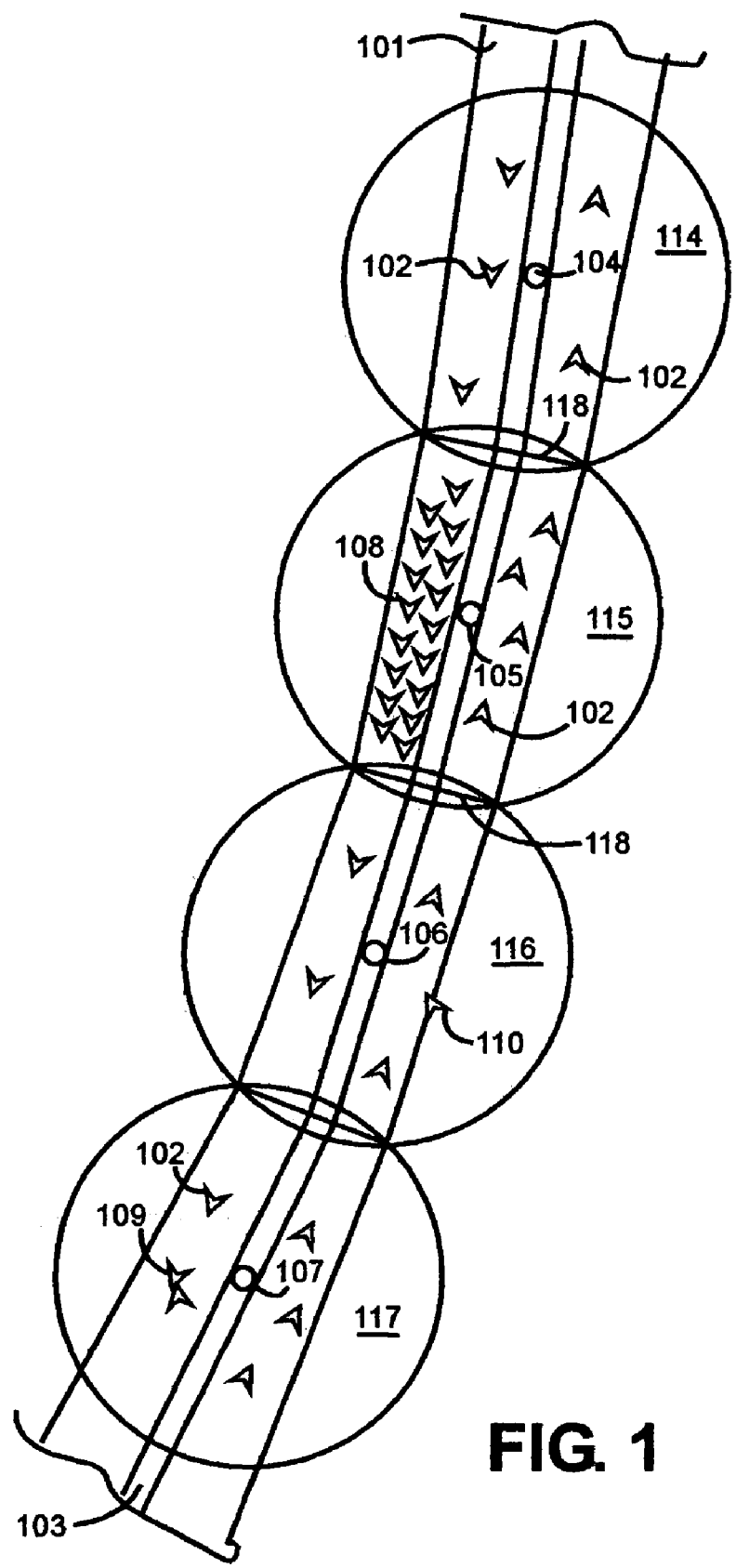
FIG. 1 is a plan or map view of a geographical region showing the layout of cellular arrays, base towers and sequences of traveling automobiles with mounted or held transceivers, e.g. cellular telephones connected to base towers.

Referring to FIG. 1, there is shown a generalized diagrammatic view of geographical landscape showing a portion of a divided 103 highway 101 with automobiles, i.e. motor vehicles 102 moving in both directions. For convenience in illustration, the drawing represents a condensed 12 to 15 mile section of highway with cellular communication towers 103 through 106 being spaced in the order of three or more miles apart. The respective RF short range frequency communication areas 114 through 117 of these towers are also shown. As will hereinafter be discussed in detail with respect to FIG. 2, the circular range areas of the cell towers overlap to include chords 118 common to adjacent circular areas. These chords 118 are substantially equivalent to the width of the highway. The width and, consequently, the common chord should include all service roads, access roads and highway service areas so that all of these areas would get the benefit of the two-way communication between the cellular towers and the transceivers, e.g. cell phones in automobiles.

It should be noted that a cellular telecommunications system has been selected to illustrate the invention because such systems are fairly pervasive on our landscapes. However, other short range communications systems may be set up with a sequence of short range RF broadcasting transceivers. For example, on highways, a sequence of periodic spaced static objects, such as road signs, may be set up with such broadcasting transceivers to transceivers in the motor vehicles.

To illustrate how the invention may be applied to the transmission of real-time information about a variety of road conditions, the following are shown: a disabled vehicle 110 that is extending on to the highway; a crash between two vehicles 109; or just very heavy traffic 108. In each case, either the vehicles involved or any passing vehicle would communicate via its transceiver to the cellular tower within its RF range area. That tower would broadcast the information to vehicles within or entering the area of its range so that such vehicles could be aware of the dangers or obstructions. In the case of some situations, the cellular tower network could be set up to relay the information to other towers so that vehicles in preceding areas could be advised of conditions well in advance. For example, when cellular tower 107 is advised of crash 109, in addition to broadcasting the information to the vehicles within its area 117, it also communicates with the base station of tower 104, as will hereinafter be described with respect to FIG. 4, so that tower 104 may broadcast the advance information to vehicles in its RF range area 114.

Now, with reference to FIG. 2, there will be described a basic way of determining the extent of overlap of the range areas 114 and 115 of two sequential towers 114 and 115 to ensure that the whole divided 103 highway 101 having a known width 118=W is within the transceiver/broadcasting range of a cellular tower.

Since we are using a cellular telecommunications system for our illustration, some background description is appropriate here. In the cellular system for the handheld mobile wireless phone, an area such as a city is broken up into small area cells. Each cell is about 10 square miles in area. Each has its base station that has a tower for receiving/transmitting and a base connected into PSTN. Even though a typical carrier is allotted about 800 frequency channels, the creation of the cells permit extensive frequency reuse so that tens of thousands of people in the city can be using their cell phones simultaneously. Cell phone systems are now preferably digital with each cell having over 160 available channels for assignment to users. In a large city there may be hundreds of cells, each with its tower and base station. Because of the number of towers and users per carrier, each carrier has a Mobile Telephone Switching Office (MTSO) that controls all of the base stations in the city or region and controls all of the connections to the land based PSTN. When a client cell phone gets an incoming call, MTSO tries to locate what cell the client mobile phone is in. The MTSO then assigns a frequency pair for the call to the cell phone. The MTSO then communicates with the client over a control channel to tell the client or user what frequency channels to use. Once the user phone and its respective cell tower are connected, the call is on between the cell phone and tower via two-way long range RF communication. In the United States, cell phones are assigned frequencies in the 824–894 MHz ranges. Since transmissions between the cell telephone and cell tower are digital, but the speaker and microphone in the telephone are analog, the cell telephone has to have a D to A converter from the input to the phone speaker, and an A to D converter from the microphone to the output to the cell tower.

Figure 2:
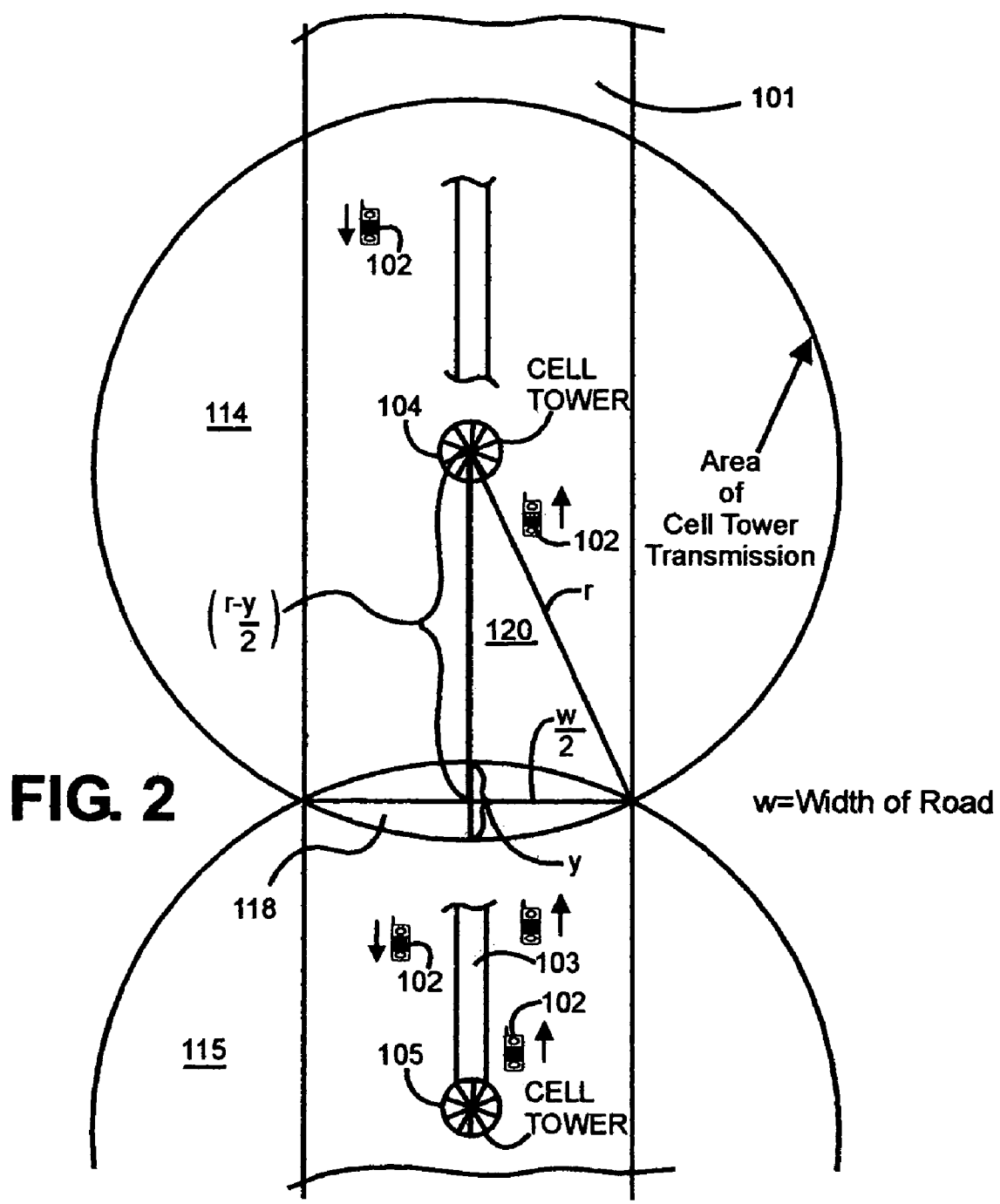
FIG. 2 is an enlarged portion of an area of FIG. 1 showing two adjacent towers laid out to illustrate how the extent of overlap of the ranges of RF radio transmission of each of the adjacent towers may be calculated to take into account the width of a highway including its access and service roads so that none of these areas is ever outside the transmission range of a tower.

Thus, using the above rudimentary data in the calculation of FIG. 2, the area 114 or 115=10 square miles. (Pi)(r) square=10 square miles; r=1.78 miles. Then, applying the general right triangle rule to triangle 120 to calculate Y that is the extent of overlap along the y axis between centers of the overlapping circular areas 114 and 115: r=the square root of (r−Y/2)square+(W/2)square. Since the values of r and W and the width of the highway to be covered are known, the value Y, the extent of overlap required to cover a common chord of width W may be calculated. Using the above calculation for example, when the width of the highway W is about ⅓ mile, then Y is only about 300 to 400 feet and the cell towers are set about 3.5 miles apart.

Now, with reference to FIG. 3, there will be described an illustrative implementation in a motor vehicle of a conventional transceiver, the transmission of which may be controlled by a standard on-board computer system. It should be understood that the actual illustrative situations being communicated are not themselves specifically pertinent to the invention. However, what is pertinent is how the operating conditions and problems are being reported via wireless communications. A vehicle, such as an automobile, has many embedded control units (not shown) positioned in dozens of places throughout the automobile. Typically, such control units are combinations of sensors and microprocessors controlling activators to function as sensors in making minor adjustments to valves and gauges, etc., to maintain parameters within operational ranges. Such control units are connected to central processing unit 30, which, in turn, is interconnected to various other components by system bus 32 and coordinates the operations. An operating system 35 that runs on processor 30 provides control and is used to coordinate the functions of the various components of the control system. The OS 35 is stored in Random Access Memory (RAM) 31, which, in a typical automobile control system, has from four to eight megabytes of memory. The programs for the various automobile monitor and control functions, including those that may be used in the present invention, are permanently stored in Read Only Memory (ROM) 33 and moved into and out of RAM to perform their respective functions. The automobile has a basic display 43 controlled through display adapter 42 to provide information to the driver, including the safety and other ancillary information to the driver. The automobile operator may provide interactive commands to the automobile control system through a user input 36 that may conveniently be implemented by standard dashboard buttons connected via an appropriate input adapter 37. Information could also be input by the driver to be transmitted to the cell tower in the area for broadcast to other vehicles.

The information from control units 27 are stored in a central storage unit 28. In automobiles, there are programs available by which the central processing unit (CPU) will analyze this stored information and then determine whether any information should be transmitted via the transceiver system 46. The system will then give the operator appropriate warning via display 43. In accordance with the present invention, the stored data in module 28 may be wirelessly transmitted to the closest cell tower on a continuous or real-time basis, as will subsequently be described. During the operation of the automobile, this data is continuously transmitted via cellular transceiver adapter 15 to cellular transceiver 16 mounted within the automobile with antenna 17 over a wireless cellular telephone system that will be described in greater detail with respect to FIG. 4. A transceiver is basically any conventional wireless cellular (transmitting/receiving) telephone mounted in the automobile under the control of processor 30 and operating as hereinafter described.

Figure 3:
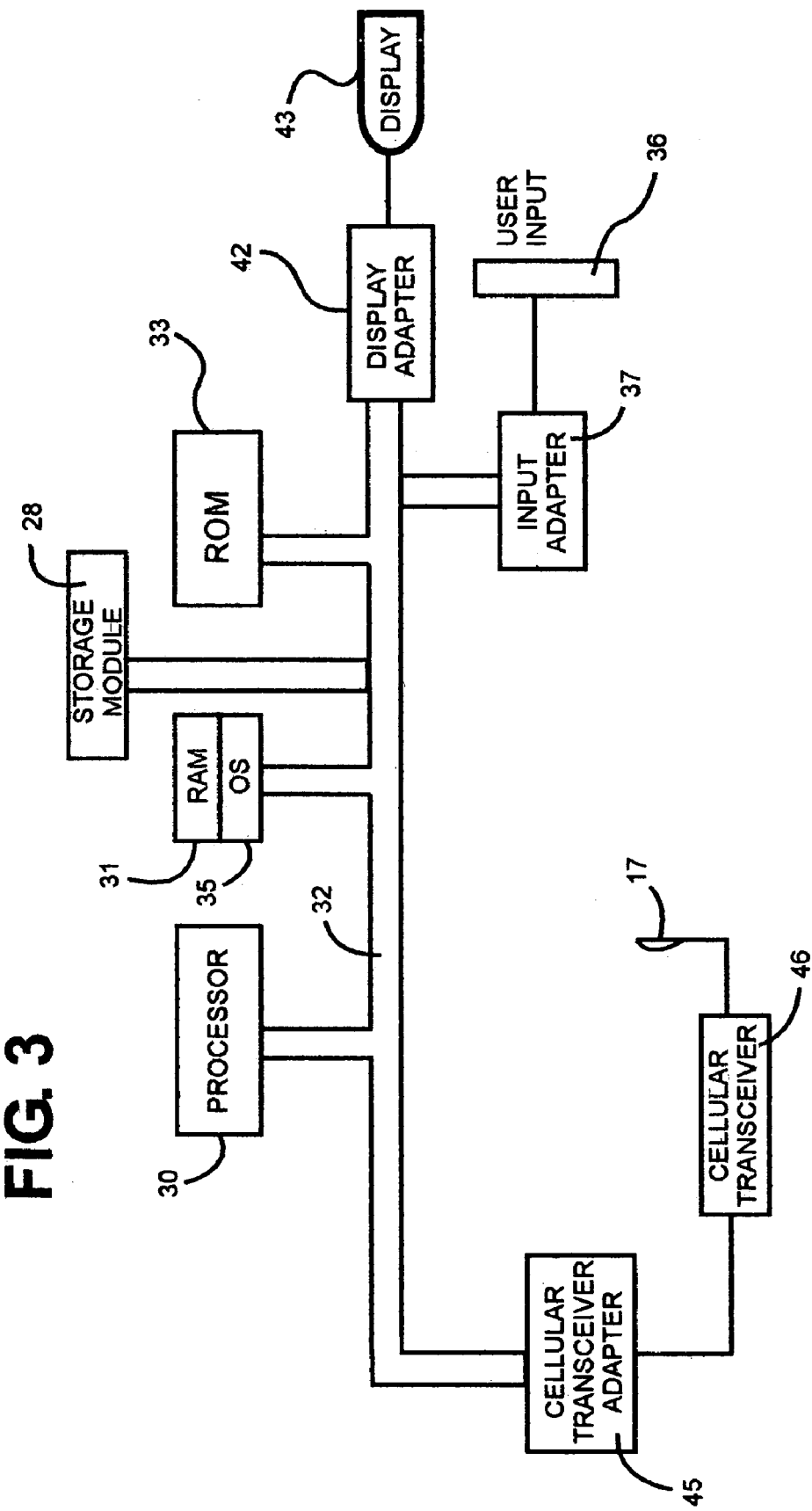
FIG. 3 is a block diagram of a generalized data processing system including a central processor unit that provides an illustration of an on-board automobile operations control system wirelessly connected to a cellular base tower.

To summarize the operations with respect to the vehicle control system of FIG. 3, information relative to the operation of the vehicle is developed and stored as described. When the developed information indicates that the driver should be advised, he is notified via display 43. Where the information is of a type that is appropriate for transmission to the nearest cell tower so that other vehicles in the area may be notified, the information may be displayed on display 43 with a prompt for the driver to notify the nearest cell tower for rebroadcast to others. If the driver chooses to do this, he may do so via user input 36. Such information of interest to other vehicles might include an indication of road icing, overheating or stalling out of the automobile in an awkward position with respect to the road. For certain monitored readings, such as a wreck with inflated air bags, the control system could conveniently bypass the driver prompt and directly telecommunicate with the nearest tower via the transceiver.

It should be noted that where a cellular telephone is used as the transceiver system in the automobile, then it is possible to use the cellular phone display with appropriate safety mounting in place of display 43. For such a function, reference is made to copending application Ser. No. 10/232, 252, filed Aug. 29, 2002, and having the same inventors as the present application, describing a detachable mounted cellular telephone that, upon engagement within the motor vehicle, bypasses the I/O display of the cellular phone in favor of the vehicle's display.

Figure 4:
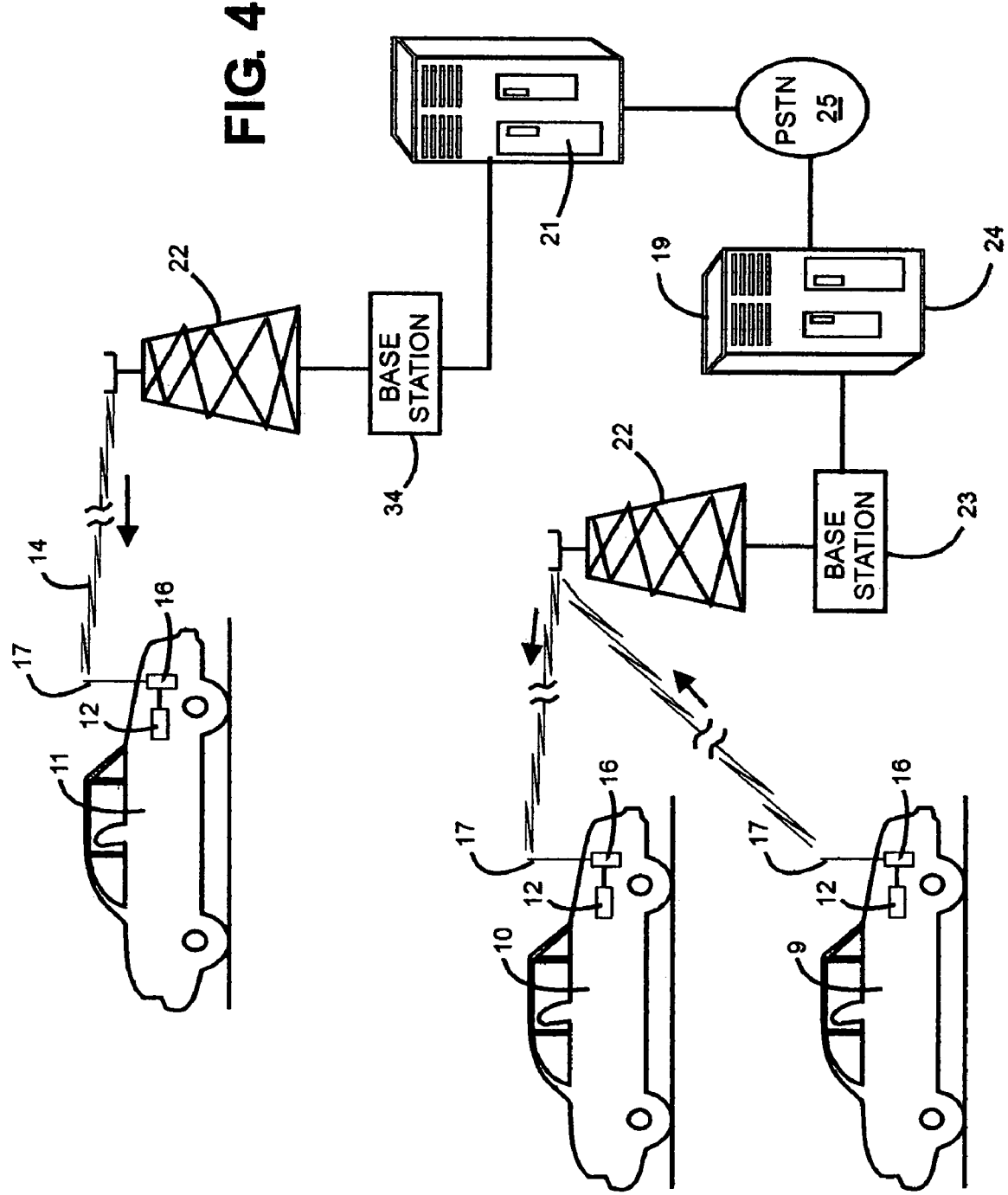
FIG. 4 is a generalized diagrammatic view of a portion of a wireless mobile cellular telecommunications network including a base station connected to a Public Switched Transmission Network (PSTN) showing the continuous transmission paths to and from automobile and base towers in accordance with the invention.

FIG. 4 is a diagrammatic illustration of information communicated via adjacent, as well as remote, cellular towers to other vehicles moving along the highway. In this illustration, automobiles 9 and 10 are in the same cellular tower RF range area while automobile 11 is in the RF range area of another more remote tower along the highway. Cellular transceivers 16 in each of the three automobiles transmit and receive signals to and from towers 22 within the 824–894 MHz frequencies. Once appropriate contact is established with a tower 22, the transmission would be conventional. The signals from automobiles 9 and 10 come from control centers 12 that represent the control centers shown in their entirety in FIG. 3, including on-board displays. The signals pass through transceivers 16 via antennae 17 and are passed through tower 22 and base station 23. Where the data conveyed relates to situations involving autos within the same RF transmission range area of the tower, appropriate programming operating within base station 23 and its associated switching center 24 will interpret the information from an automobile and then broadcast, from the same tower, information of interest to automobiles within the same range area appropriate to the transmitted situation. On the other hand, if the situation described in the received transmission could be of interest to automobiles in other cell tower areas, then the base station 23 controls the routing of the call to a PSTN 25, the above-mentioned MTSO associated with the switching center 24. The PSTN 25, then, in the conventional cellular manner, routes the call through switching center 21 through the remote base station 34 of cellular tower 22 that then broadcasts 14 the information of interest to the automobiles, as represented by automobile 11, in the other more remote cellular transmission area served by the tower.

Although certain preferred embodiments have been shown and described, it will be understood that many changes and modifications may be made therein without departing from the scope and intent of the appended claims.

What is claimed is:

1. A system for broadcasting short range RF real-time information to motor vehicles traveling along a roadway comprising:

a sequence of transceiving short range broadcast stations at fixed positions along said highway, said stations spaced so that the broadcast ranges of said stations tangentially overlap each other;

a sequence of motor vehicles moving along said roadway, each vehicle including a transceiver for said short range RF signals;

means in each of said motor vehicles with said transceivers for transmitting data specific to said transmitting motor vehicle; and means in said broadcast stations, receiving said data specific to said motor vehicle, for broadcasting said data specific to said transmitting motor vehicle to all of said motor vehicle transceivers within the broadcasting range of said broadcasting stations.

2. The short range RF broadcasting system to motor vehicles of claim 1 wherein said short range frequency is in the range of 824–892 Mhz.

3. The short range RF broadcasting system to motor vehicles of claim 2 wherein:

said broadcast stations are cellular broadcast towers spaced on said roadway; and said transceivers in said motor vehicles are cellular telephones.

4. The short range RF broadcasting system to motor vehicles of claim 1 further including:

means associated with each of the broadcast stations for providing information zones along said roadway respectively defined by the broadcast range of the closest broadcast station, and said means for broadcasting in each zone include means for broadcasting information of particular interest to all motor vehicles in each zone.

5. The short range RF broadcasting system to motor vehicles of claim 4 wherein said broadcast information is of particular interest to all motor vehicles in each zone, includes said data specific to a transmitting vehicle in the respective zone.

6. The short range RF broadcasting system to motor vehicles of claim 5 wherein said broadcast information relates to a breakdown of the transmitting vehicle.

7. The short range RF broadcasting system to motor vehicles of claim 5 wherein said broadcast information relates to road hazards in the respective zone as noted by the transmitting vehicle.

8. The short range RF broadcasting system to motor vehicles of claim 5 wherein said broadcast information relates to traffic conditions in the respective zone as noted by the transmitting vehicle.

9. The short range RF broadcasting system to motor vehicles of claim 5 wherein said broadcast information relates to traffic conditions in zones other than the broadcast zone as noted by a transmitting vehicle.

10. The short range RF broadcasting system to motor vehicles of claim 1 further including display means in each of said motor vehicles associated with said transceivers for displaying received broadcast data.

11. In a system for broadcasting short range RF real-time information to motor vehicles traveling along a roadway comprising a sequence of transceiving short range broadcast stations at fixed positions along said highway, said stations spaced so that the broadcast ranges of said stations tangentially overlap each other, a short range RF broadcasting method comprising:

provided a sequence of motor vehicles along said roadway, each vehicle including a transceiver for said short range RF signals;

enabling the transmission from each of said motor vehicles with said transceivers of data specific to said transmitting motor vehicle; and enabling each of said broadcast stations, receiving said data specific to said motor vehicle, to broadcast said data specific to said transmitting motor vehicle to all of said motor vehicle transceivers within the broadcasting range of said broadcasting stations.

12. The short range RF broadcasting method to motor vehicles of claim 11 wherein said short range frequency is in the range of 824–892 Mhz.

13. The short range RF broadcasting method to motor vehicles of claim 12 wherein:

said broadcasts are cellular communications; and said transceivers in said motor vehicles are cellular telephones.

14. The short range RF broadcasting method to motor vehicles of claim 11 further including the steps of:

providing information zones along said roadway respectively associated with each of the broadcast stations, each of said zones defined by the broadcast range of the closest broadcast station, and broadcasting information of particular interest to all motor vehicles in each zone.

15. The short range RF broadcasting method to motor vehicles of claim 14 wherein said broadcast information is of particular interest to all motor vehicles in each zone and includes said data specific to a transmitting vehicle in a the respective zone.

16. The short range RF broadcasting method to motor vehicles of claim 15 wherein said broadcast information relates to a breakdown of the transmitting vehicle.

17. The short range RF broadcasting method to motor vehicles of claim 15 wherein said broadcast information relates to road hazards in the respective zone as noted by the transmitting vehicle.

18. The short range RF broadcasting method to motor vehicles of claim 15 wherein said broadcast information relates to traffic conditions in the respective zone as noted by the transmitting vehicle.

19. The short range RF broadcasting method to motor vehicles of claim 15 wherein said broadcast information relates to traffic conditions in zones other than the broadcast zone as noted by a transmitting vehicle.

20. The short range RF broadcasting method to motor vehicles of claim 11 further including the step of displaying received broadcast data in association with said transceivers in each motor vehicle.

* * * * *